F. T. JOHNSON.
MECHANICAL MOVEMENT.
APPLICATION FILED SEPT. 1, 1916.
1,218,778.
Patented Mar. 13, 1917.
4 SHEETS—SHEET 1.
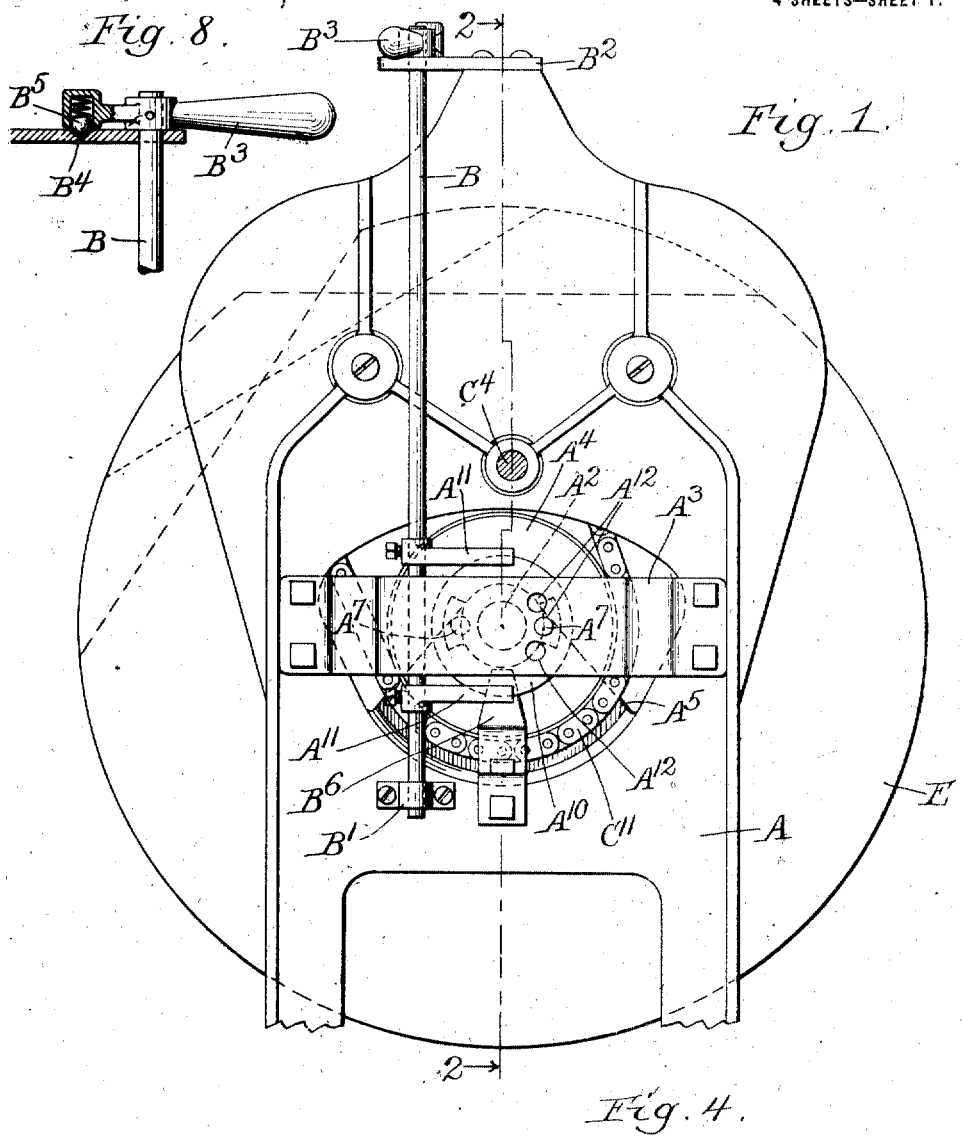
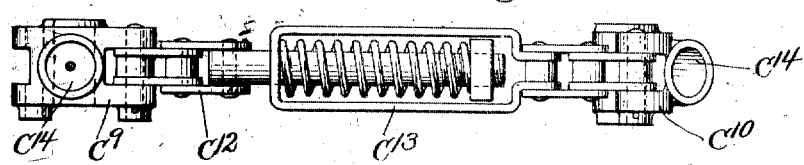
Witnesses
Edward F. Wray
Inventor
Francis T. Johnson
by Parks & Carter
Attorneys

F. T. JOHNSON.
MECHANICAL MOVEMENT.
APPLICATION FILED SEPT. 1, 1916.

1,216,778.

Patented Mar. 13, 1917.
4 SHEETS—SHEET 2.

Witnesses
Edward T. Wray
Marian L. Ingraham

Inventor
Francis T. Johnson
by Parker & Carter
Attorneys

F. T. JOHNSON.
MECHANICAL MOVEMENT.
APPLICATION FILED SEPT. 1, 1916.

1,218,778.

Patented Mar. 13, 1917.
4 SHEETS—SHEET 3.

Witnesses
Edward T. Wray
Marion L. Ingraham

Inventor
Francis T. Johnson
by Parker & Carter
Attorneys

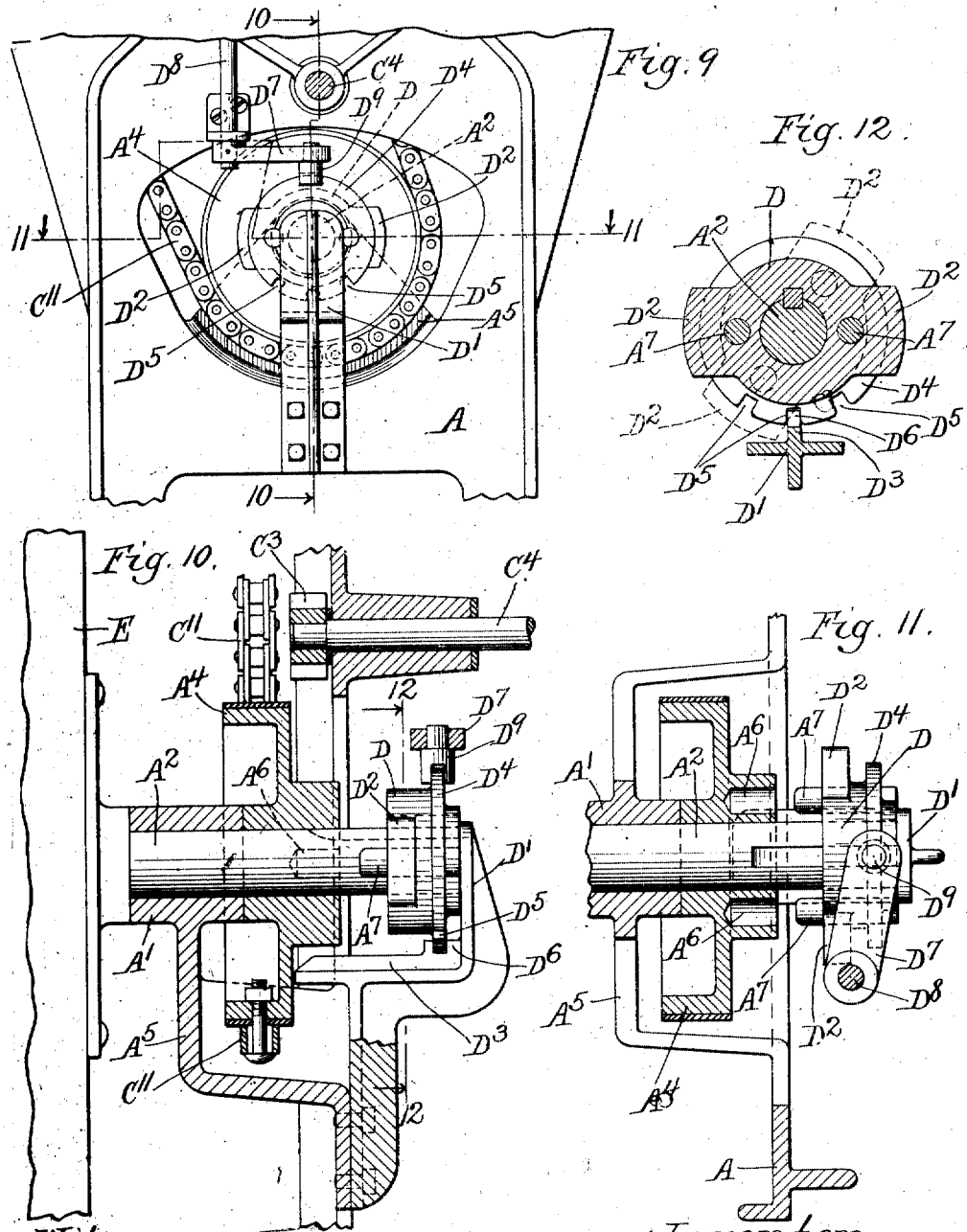

UNITED STATES PATENT OFFICE.

FRANCIS T. JOHNSON, OF CHICAGO, ILLINOIS.

MECHANICAL MOVEMENT.

1,218,778.   Specification of Letters Patent.   Patented Mar. 13, 1917.

Application filed September 1, 1916. Serial No. 117,967.

*To all whom it may concern:*

Be it known that I, FRANCIS T. JOHNSON, a citizen of the United States, residing at Chicago, in the county of Cook and State of Illinois, have invented a certain new and useful Improvement in Mechanical Movements, of which the following is a specification.

My invention relates to improvements in mechanical movements and has for one object to provide a new and improved driving mechanism, or mechanical movement, whereby the power which is applied to a rotating part will cause the oscillation of another rotatably mounted part. I have illustrated the invention as applied to a washing machine, but it is perfectly obvious that the scope of my device is not to be limited to such use.

The invention is illustrated more or less diagrammatically in the accompanying drawings, wherein—

Figure 1 shows an end elevation with parts broken away;

Fig. 4 is a section along the line 4—4 of Fig. 3;

Fig. 8 is a section along the line 8—8 of Fig. 7;

Figure 2:
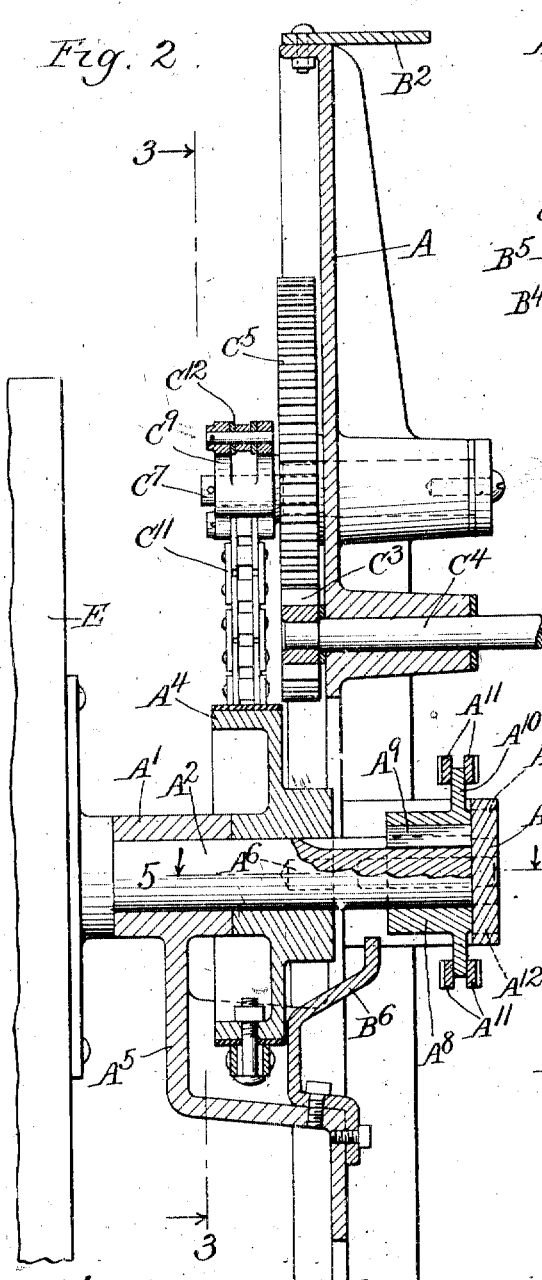
Fig. 2 is a section along the line 2—2 of Fig. 1.
Figure 7:
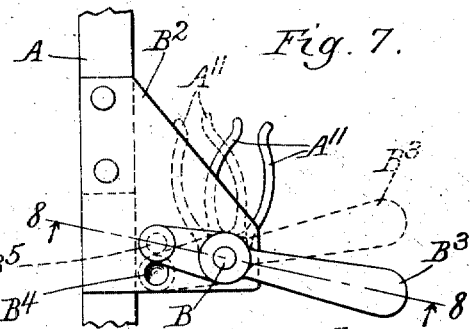
Fig. 7 is a detail view of control handle and associated parts.
Figure 6:
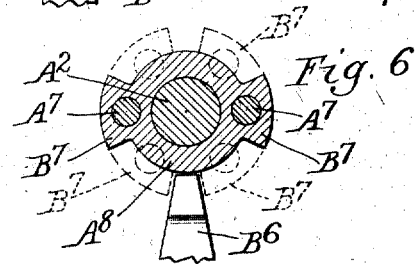
Fig. 6 is a section along the line 6—6 of Fig. 5.
Figure 5:
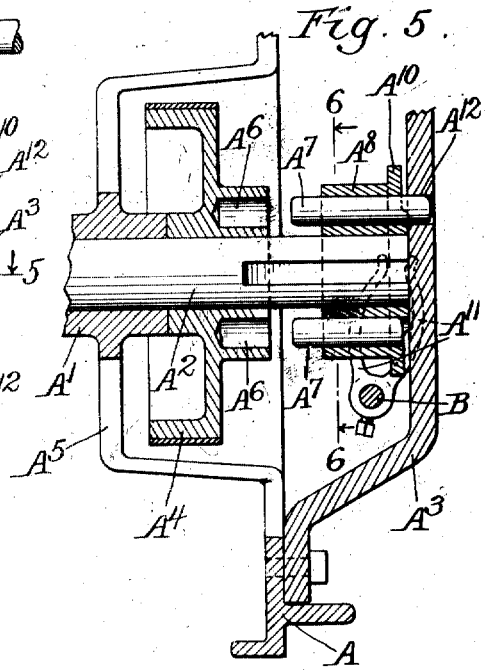
Fig. 5 is a section along the line 5—5 of Fig. 2.
Figures 3, 13:
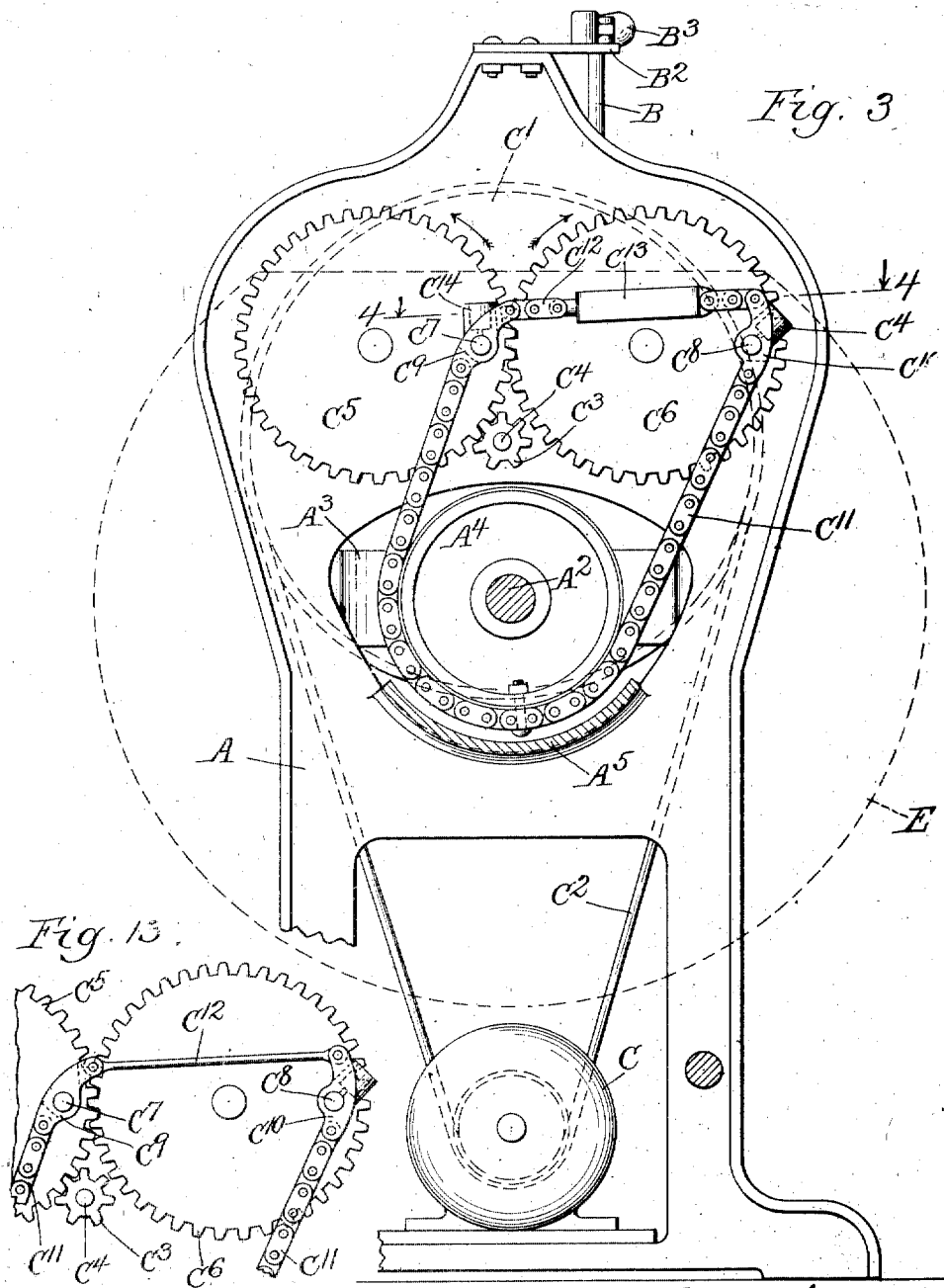
Fig. 3 is a section along the line 3—3 of Fig. 2.

Fig. 9 a detail with parts broken away and omitted, showing a modified form;

Fig. 10 is a section along the line 10—10 of Fig. 9;

Fig. 11 is a section along the line 11—11 of Fig. 9;

Fig. 12 is a section along the line 12—12 of Fig. 10;

Fig. 13 details showing modified form wherein no spring is interposed between the rocker arms.

Like parts are indicated by like characters in all drawings.

A, is the end frame of a washing machine. It carries a bearing sleeve $A^1$ in which is rotatably mounted an axle shaft $A^2$ rigidly attached to and carrying the rotatably mounted tub E. The sleeve $A^1$ is located on the inner side of the frame and the axle shaft $A^2$ extends outwardly through the aperture in the frame. $A^3$ is a yoke on the outside of the frame A in engagement with the end of the shaft $A^2$ to limit its longitudinal movement. $A^4$ is a driving pulley rotatably mounted on the shaft $A^2$ contained partially within the pocket formed by the sleeve supporting wall $A^5$ on the inner side of the frame A.

The hub of the pulley $A^4$ is provided with diametrically opposed clutch pockets $A^6$ adapted to be penetrated by clutch pins $A^7$ carried by the clutch sleeve $A^8$. This clutch sleeve $A^8$ is splined on the shaft $A^2$ by means of the key $A^9$. It is provided with a flange $A^{10}$ adapted to be engaged by the shifting fingers $A^{11}$ on diametrically opposed sides.

The yoke $A^3$ is provided with perforations $A^{12}$. The clutch pin $A^7$ has an extension adapted to engage one or other of these perforations to lock the tub in fixed position when the clutch is out of engagement with the driving pulley.

The clutch-controlling-arms $A^{11}$ are mounted on a vertical shaft B, which shaft extends upwardly along the front of the frame A. It is mounted at one end in a bearing $B^1$ and at the top passes through a bracket plate $B^2$ anchored on the frame A. The controlling handle $B^3$ is provided for the manipulation of parts to control the clutch and has in its upper surface depressions $B^4$ adapted to be engaged by the spring pressed ball $B^5$ to yieldingly lock the clutch in the open or closed position, as the case may be.

$B^6$ is a stop finger bolted to the frame A and extended upwardly toward the clutch member $A^8$. The clutch member $A^8$ is provided on either side with ears $B^7$ so disposed as to limit the rotary movement of the tub by engagement between the ears and the stop finger.

C is a motor. It drives a pulley $C^1$ by means of a belt $C^2$. $C^3$ is a pinion on the pulley shaft $C^4$. This pinion is in mesh with the gear $C^5$ which gear is in mesh with the gear $C^6$; both the gears and pinions being all of them rotatably mounted on the inner side of the frame A. $C^7$—$C^8$ are crank pins, projecting outwardly from the gears $C^5$—$C^6$, and separated by an angle of 180°. $C^9$—$C^{10}$ are rock levers mounted on these crank pins, which levers carry the ends of the driving chain $C^{11}$, which chain is wound about the pulley $A^4$ and anchored at one point thereon. The longer arms of the levers are tied together by the chain or belt $C^{12}$, and in one form this chain or belt $C^{12}$ has interposed between its ends, the spring shackle $C^{13}$. Oil cups $C^{14}$ are provided in the upper sides of the levers for their lubrication.

In the modified form shown in Figs. 9—12 inclusive, the clutch collar D is splined on the shaft $A^2$ and its outward movement away from the driving pulley hub is limited by the bracket $D^1$. The clutch collar D is provided on opposite sides with ears $D^2$ adapted to project out so as to strike the rib $D^3$ on the bracket $D^1$, if the tub rotates through a sufficiently wide arc. $D^4$ is a flange on the clutch collar D notched as at $D^5$; the rib $D^3$ being provided with a raised portion $D^6$, to engage one or other of said notches when the clutch is in the disengaged position. The clutch is shifted by means of an arm $D^7$ on a shaft $D^8$, this arm being provided at its end with a split pin $D^9$ to engage flange $D^4$.

The use and operation of my invention are as follows:

The motor is operated in the usual way to drive the pulley, which in turn causes the driving pinion to rotate the two gears in opposite directions. As these two gears rotate in opposite directions and as they carry with them the crank pins they are separated by an oscillating or reciprocating motion, because as one pin moves toward the driving pulley, the other moves away from it. This results, of course, since the belt is anchored on the driving pulley, in oscillating that pulley.

If the distance between the center of rotation of each driving gear and the center of rotation of the pulley were infinity, then both sides of the chain would always be right, because there would be no angularity to be considered; but because the distance between the centers is short, it is evident that the movement toward and from the driving pulley of the two crank pins is not absolutely constant, so one end of the belt may at times, if the belt is not elastic, be a little loose.

In order to overcome or compensate for the slight differential action of the two crank pins, the two rocking levers are provided. By inspection it will be seen that with the parts in position shown in the full line of Fig. 3, the right hand lever is more nearly parallel with its belt end that is the left end lever. This is because just at that position, there is a little too much chain on the left end side and not quite enough on the right end side. As the crank pins rotate, these levers rock slightly so as to compensate at all times for this difference, the result is that as one crank pin catches up with the normal movement, the lever will rock from its normal inclined position toward a position in line with the chain so as to increase slightly the length of chain more than the other lever will have rocked slightly to take up the slack on the other end of the chain, thus compensating at that point for the slight relative degree in speed of movement of the crank pin. With a link connecting the free ends of compensating levers, the levers will move in unison and so when one takes up slack at one end of the belt, the other will pay out exactly the same amount of slack at the other end. Thus by proper proportioning of the lengths of the levers the throw of the crank pins and the length of the belt, the parts can be so arranged that the belt will always be tight, and positive drive will always be had.

However, this arrangement does not give any elasticity in the driving connections and when heavy loads are to be suddenly stopped and started, it is exceedingly desirable to cushion the shock and I provide this cushion by substituting for the length which of course is rigid, a flexible, extensible connection. When this is used, however, the arrangement of the parts of it preferably would be so changed that the levers do not absolutely compensate for the differential components of the crank pin movements. Thus as the spring connection gives and takes the belt will always be tight, though the load will be stopped and started and cushioned by the normal action of the spring.

I claim:—

1. A driving mechanism comprising a pair of cranks and means for rotating them in opposite directions, compensating levers rotatably mounted one upon each crank, a rotatably mounted driven member, a flexible belt in peripheral engagement therewith, its ends being anchored on one of each said compensating levers.

2. A driving mechanism comprising a pair of cranks and means for rotating them in opposite directions, compensating levers rotatably mounted one upon each crank, a rotatably mounted driven member, a flexible belt in peripheral engagement therewith, its ends being anchored on one of each said compensating levers and a straight line connection between the free ends of said levers.

3. A driving mechanism comprising a pair of cranks and means for rotating them in opposite directions, compensating levers rotatably mounted one upon each crank, a rotatably mounted driven member, a flexible belt in peripheral engagement therewith, its ends being anchored on one of each said compensating levers and a yielding connection between the free ends of said levers.

4. A driving mechanism comprising a pair of cranks and means for rotating them in opposite directions, compensating levers rotatably mounted, one upon each crank, a rotatably mounted driven member, a flexible belt in peripheral engagement therewith, its ends being anchored on one of each said compensating levers and a straight line connection between the free ends of said levers, the free arms of said levers being bent inwardly toward one another.

5. A driving mechanism comprising a pair of cranks and means for rotating them in opposite directions, compensating levers rotatably mounted one upon each crank, a rotatably mounted driven member, a flexible belt in peripheral engagement therewith, its ends being anchored on one of each said compensating levers and a yielding connection between the free ends of said lever, the free arms of said levers being bent inwardly toward one another.

6. A driving mechanism comprising a pair of cranks separated by an angle of 180°, and means for rotating them in opposite directions, a compensating bell crank lever mounted on each crank, a rotatably mounted driving member, a flexible belt in peripheral engagement therewith, its ends being attached to the ends of said cranks and a straight line flexible connection between the free ends of said cranks.

In testimony whereof I affix my signature in the presence of two witnesses this 16th day of August, 1916.

FRANCIS T. JOHNSON.

Witnesses:
MARION L. INGRAHAM,
RUTH E. CARLSON.